United States Patent [19]

Franklin

[11] 4,334,240

[45] Jun. 8, 1982

[54] INTERPOLATION METHODS AND APPARATUS

[75] Inventor: Paul E. Franklin, London, England

[73] Assignee: Crosfield Electronics Limited, London, England

[21] Appl. No.: 165,435

[22] Filed: Jul. 2, 1980

[30] Foreign Application Priority Data

Jul. 3, 1979 [GB] United Kingdom ............... 7923175

[51] Int. Cl.³ .............................................. G03F 3/08
[52] U.S. Cl. ...................................... 358/78; 358/80
[58] Field of Search ................... 358/75, 76, 77, 78, 358/79, 80; 340/728

[56] References Cited

FOREIGN PATENT DOCUMENTS 2813519 10/1978 Fed. Rep. of Germany.
1369702 10/1974 United Kingdom ................. 358/78

OTHER PUBLICATIONS

Gallagher, "Representation of Element Behavior Functions and Geometry", From Finite Element Analysis Fundamentals, Prentis-Hall, 1975, pp. 211-247.

Primary Examiner—Michael A. Masinick
Attorney, Agent, or Firm—Sughrue, Mion, Zinn, Macpeak and Seas

[57] ABSTRACT

The invention relates to methods and apparatus for interpolating between coarse stored data to achieve a more accurate answer, and is particularly applicable to color scanning reprographic equipment. Color scanners (5) analyze an original to obtain digital signals (8) representing three primary color intensities. The values for the intensities of each of four printing colors, including black, are functions of all three primary color intensities, and a limited quantity of these sets of four values is stored in a three dimensional matrix (25), consisting of cubes with values at their corners. To obtain values from these coarse stored data corresponding to a point (P) within a cube, an interpolator (26) determines which one, of the three pyramids (e.g. W B G C V in FIG. 2) comprising the cube, contains the point, and interpolates within that pyramid between the values at its five vertices.

6 Claims, 4 Drawing Figures

INTERPOLATION METHODS AND APPARATUS

This invention relates to methods and apparatus for interpolating between coarse stored data to achieve a more accurate answer. The invention is particularly applicable to colour scanning reprograhpic equipment.

In colour reproduction equipment, minicomputers and microprocessors are being utilised more and more to enable more powerful processing to be implemented. However, these colour scanners run at very high speeds and even the fastest computers cannot execute the required calculations in "real-time" for practical scanners.

A known solution to this problem is to set up the required reproduction characteristics and then to compute the output of the scanner for all possible input combinations and to store the output data in a "look-up table". In subsequent scanning of a picture, no processing needs to be done—the input values are merely used to address the look-up table to locate the required answer.

Colour scanners analyse an original to be reproduced with three primary color analysing channels, and in a digital scanner these inputs must be quantised, preferably to at least eight bits, to achieve a high quality print. This would give $2^{24}$ possible input combinations and would necessitate a correspondingly large look-up table store which would be prohibitive in terms of cost and in the time taken to load it. A solution to this problem is given in our British Pat. No. 1,369,702, wherein the look-up table is computed only from the four most significant bits of each channel, giving $2^{12}$ combinations. During scanning, the four most significant digits of each channel are used to address this "coarse" look-up table, while the four least significant digits of each channel are used to interpolate between neighbouring points of the table.

The interpolator described in the above mentioned patent specification is a linear interpolator i.e. it assumes that the function being interpolated is linear within the space between the coarse table points. This is not generally true and some error must occur since curves are being approximated to by a series of straight lines. In most cases the errors are small and quite acceptable but in some instances, in particular black printer generation, the errors can be serious. The present invention seeks to eliminate or reduce these errors.

Before defining the invention, the difficulties created by linear interpolation will be illustrated by means of an example involving three-dimensional colour space. Although a memory store for storing three-dimensional colour data does not arrange the information physically in corresponding three-dimensional space, it is convenient to represent the stored data in this way. With equally-sized units in each dimension, the three-dimensional store can therefore be represented conceptually as a matrix of cubes, of which two adjacent cubes are shown in FIG. 2 the accompanying drawings. The "coarse" colour signal data are stored at the corners of the cubes at three-dimensional addresses corresponding to respective three-dimensional colour input signal values. These "interpolator cubes" or unit interpolation cubes are formed by an addressed point in the look-up table and the seven neighbouring points which would be addressed by incrementing by one "coarse" unit the four most significant bits of each channel singly and in all combinations.

For each three-dimensional set of input colour signals, there is stored a set of four output colour signal values, for the four printing colours. Conceptually, there are therefore four cubic matrices, each one addressable by a set of input colour signals. However, this can be envisaged as a single cubic matrix, all four cubic matrices overlapping exactly, with a set of four output colour signal values being stored at each vertex of the single cubic matrix. Interpolation between "coarse" values takes place for each of the four printing colours, using the cubes of the matrix as "interpolator cubes".

FIG. 2 shows an interpolator cube taken from a "linear matrix" of cyan values. The term linear matrix is used to describe a look-up table in which any input value addresses a location in store where the value itself is stored. In this case, whatever input comes in to the scanner the same value is obtained at the output. It will be appreciated that in general it is not possible to interpolate between a coarse signal C and the incremented signal C+1 solely from a consideration of the fraction c represented by the least significant bits of the digital cyan signal; this is because the amount of cyan required is also affected by the values of the yellow and magenta signals.

If the linear matrix look-up table is addressed with the input combination 0010  0000=32 decimal 0010  0000=32 decimal 0010  0000=32 decimal the interpolator cube addressed will be as shown in FIG. 2 for cyan. Analogous cubes will be addressed for magenta, yellow, and black, where a black printer is used. The point $C_{Y,M,C}$ in FIG. 2 represents the decimal value (32,32,32) referred to above and will be referred to as "white" for the purposes of the interpolation. The point $C_{(M+1)(Y+1)(C+1)}$, incremented by one coarse unit in each direction, thus represents in decimal terms a point (48, 48, 48). The values for c, y, m are given by the four least significant digits of the terms of the input combination and are expressed as fractions, i.e. the bit combination 1000, being a half of the basic "coarse" unit, gives a value of one half for the corresponding colour "remainder" m, y or c.

The known interpolator algorithm is:

| Cyan output = | $C_{YMC}$ | $\times (1-m)(1-y)(1-c)$ | (1) |
|---|---|---|---|
| + | $C_{MY(C+1)}$ | $\times (1-m)(1-y)c$ | |
| + | $C_{M(Y+1)C}$ | $\times (1-m)y(1-c)$ | |
| + | $C_{M(Y+1)(C+1)}$ | $\times (1-m)yc$ | |
| + | $C_{(M+1)YC}$ | $\times m(1-y)(1-c)$ | |
| + | $C_{(M+1)Y(C+1)}$ | $\times m(1-y)c$ | |
| + | $C_{(M+1)(Y+1)C}$ | $\times my(1-c)$ | |
| + | $C_{(M+1)(Y+1)(C+1)}$ | $\times myc$ | |

This algorithm, states that the cyan output is the weighted average of the cyan value obtained by the initial address and the values which would have been addressed if the address bits were incremented in each colour direction, the weighting functions being determined by the low bit triple products. If a point P is chosen in the centre of the cube, the algorithm gives as output:

```
    32    ×   ½   ×   ½   ×   ½
+   32         "       "       "
+   32         "       "       "
+   32         "       "       "
+   48         "       "       "
+   48         "       "       "
+   48         "       "       "
+   48         "       "       "
= 40 (y = m = c = ½).
```

This is exactly the right answer, being midway between 32 and 48.

The black printer however is determined by the lowest of the three colour signals—there is a large black content in neutral areas, but little in the pure colours. As a simplified example, take the case where the black printer value is equal to the lowest of the three input colour signals (in practice a more complicated function would be used). For this example, in terms of the interpolator cube of FIG. 2, the black content would be 32 in all corners except the black corner which would have 48.

A similar calculation for the black printer, involving the terms Black $(Y,M,C)$ etc., would therefore give:

$$(7 \times 32 \times \tfrac{1}{8}) + (\tfrac{1}{8} \times 48) = 34$$

This is erroneous, as the true value should again be 40. The error arises because the algorithm is not able to resolve the nonlinearity arising from the fact that black increases along the neutral axis, but not along the colour directions.

For simplicity, in illustrating the black printer error in the example given above, a linear matrix look-up table has been assumed. It will be appreciated that in practice for colour scanner purposes such linear matrix look-up tables do not occur and that as a consequence the values obtained by interpolation for the colour components cyan, magenta and yellow are also in general incorrect due to the fact that the above-quoted interpolation algorithm operates in a linear manner while the function defined by the look-up table has curvature.

It will be recognised that in interpolation procedures, all polynomial methods of degree greater than one are ineffective when used across a singularity, such as the line singularity along the black-white diagonal in the case of the black printer discussed above. To take account of this, it is necessary to sub-divide the cube so that the black-white diagonal is an edge of the sub-divided volume.

In the case of a rectangle, it has been proposed to sub-divide the unit rectangle into triangles. Interpolation within triangles has been discussed, for example by R. H. Gallagher in "Finite Element Analysis Fundamentals", published by Prentice-Hall, New Jersey, 1975. In this publication, the author first discusses interpolation procedures for triangular elements and derives co-ordinate values for a point within the triangle, each co-ordinate value being the sum of three products, each product involving the rectangular co-ordinates of a respective corner of the triangle and the ratio of the area of a smaller triangle, defined by the other two corners and the point within the triangle, to the area of the triangle as a whole. Thereafter, the use of the tetrahedron, the three-dimensional counterpart of the planar triangle, is discussed and volume ratios are derived to replace the area ratios used in the case of the triangle.

The present invention consists in a method of reproducing a coloured original in which the original is scanned to obtain signals representing three colour-component densities of successively scanned picture elements of the original and in which the said signals are corrected before being used to control the treatment of an output surface, the method comprising, prior to the scanning of the original, the steps of deriving for each of a number of sets of three input digital colour-component values, less in number than the sets of possible input digital colour-component values available from the scanner, a set of four corrected colour component values in digital form, one for each of the three colour components and one for black, and loading the sets of four corrected colour-component digital values into the storage locations of a three-dimensional store; and thereafter the steps of referring to the store in accordance with the succession of sets of three colour-component signals derived from the scanning of the original to obtain from the store a succession of corrected digital values and of obtaining values intermediate the sets of digital values stored for unit cubes within the three-dimensional store by on-line interpolation, and then controlling the treatment of the output surface in accordance with the four values obtained, and in which each of the four values for a point within a unit interpolation cube of the three-dimensional colour space is obtained by first determining in which of three pyramids, which together make up the unit interpolation cube and have as a common edge the "neutral axis" of the unit interpolation cube, the said point is contained, and then deriving a value for the said point by interpolation within the pyramid.

To interpolate within the pyramid, a "parallel plane" method of linear interpolation is preferably used.

The term "cube" has been used for brevity but is intended to cover any unit interpolation rectangular parallelepiped.

The expression "neutral axis" as used in this specification is intended to mean the axis of increasing blackness. Thus, "neutral axis" covers not only white-black axis for unit interpolation cubes so positioned in colour space that the white-black axis of colour space passes through them, but also the axis parallel to the white-black axis for unit interpolation cubes which do not have the white-black axis passing through them. It will be seen that although a point on the "neutral axis" in these latter cubes does not represent a grey tone, the axis is nevertheless an axis of increasing blackness.

In order that the invention may be better understood, an example of colour reproduction equipment embodying the invention will now be described with reference to the accompanying drawings, in which.

Figure 1:
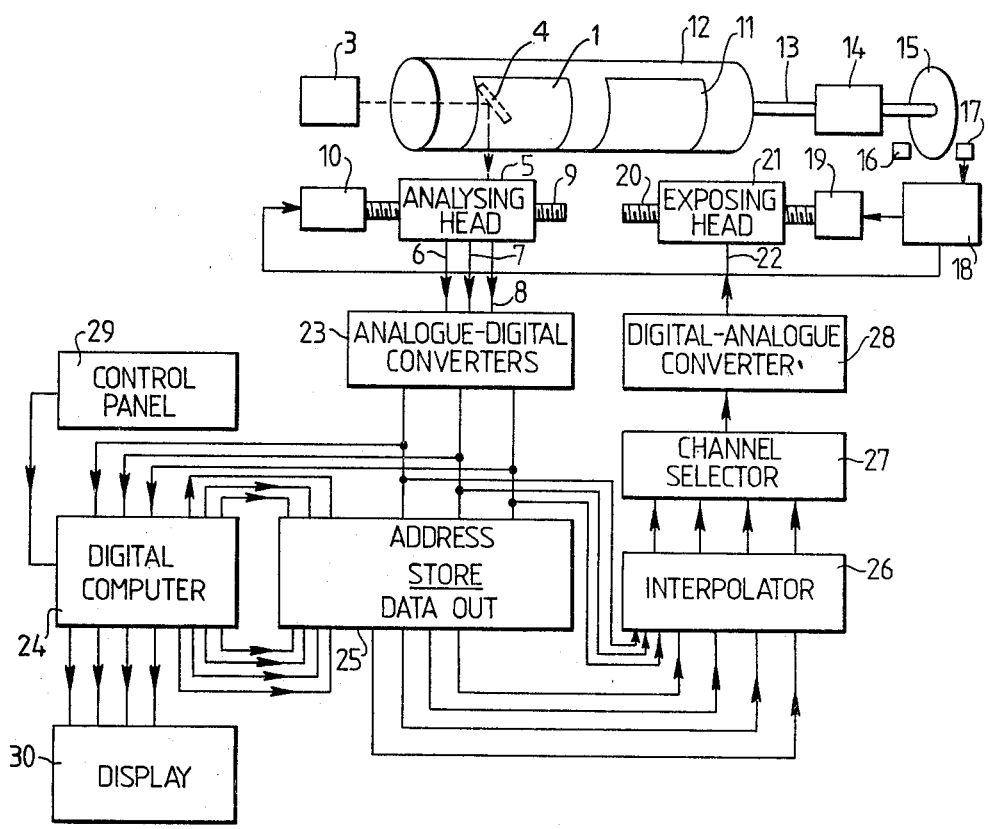
FIG. 1 illustrates diagrammatically an apparatus and control circuit for image reproduction.

In FIG. 1, a transparent original 1 to be reproduced is wrapped around the surface of a transparent drum 12. A xenon lamp 3 directs light rays into the drum and on to a 45° mirror 4, from which the rays pass through the wall of the drum and through the transparent original 1. These light rays reach an analysing head 5 containing colour filters and photoelectric devices such that signals representing the red, blue and green densities of the scanned element of the picture 1 are produced on lines 6, 7 and 8 respectively. Because printing is carried out in subtractive colours, the lines 6, 7 and 8 will be considered to be part of the cyan, yellow and magenta colour channels. The analysing head 5 is mounted on a lead screw 9 which is driven in synchronism with the rotation of the drum 12 by a motor 10. As a consequence, the analysing head sees a point on the drum 12 which as the drum rotates and the analysing head moves along its lead screw, traces out a helical path along the drum 12 and consequently traces out a number of parallel scanning lines on the original 1.

A light-sensitive sheet 11 to be exposed is mounted on the drum 12 which, is on a shaft 13 driven by a motor 14. The motor also drives a slotted disc 15, the slotted periphery of which rotates between a light source 16 and a photoelectric cell 17. Pulses derived from the photoelectric cell 17 are applied to a control unit 18 which controls the rotation of the motor 10, driving the lead screw for the analysing head, and a motor 19 which drives a lead screw 20 on which is mounted an exposing head 21. The exposing head 21 includes a light source which traces out a helical pattern on the drum 12 and which is modulated by a signal on a line 22. This signal is derived from the input signals on lines 6, 7 and 8 in the following manner.

The signals on the lines 6, 7 and 8 are first applied to analogue-digital converters 23, the digital outputs of which can be connected to a digital computer 24 and also to a digital store 25 and an interpolator 26. The store 25 uses the three digital signals from the converters 23 as address signals and provides at its output four signals which are stored in the location represented by that address. These four signals are the corrected signals for cyan, yellow and magenta, together with a black signal. The black signal is approximately equal to the smallest of the colour signals and the values of the colour signals obtained from the store are reduced in accordance with the value of the black signal. In effect, the store 25 is equivalent to 4 look-up tables, one for each of the three colour components and one for black; each look-up table is addressed with each of the three input colour components signals.

In the example shown, the interpolator permits the required output-input relationship to be maintained for changes in signal level finer than would be permitted by the store 25, as will be described. A channel selector 27 receives the four signals, representing the cyan, yellow and magenta printer values and the black printer value, and selects the one which corresponds to the separation to be made with the light-sensitive sheet 11. This signal is converted into analogue form in the converter 28 and is then used to modulate the light source in the exposing head 21.

For the preliminary loading of the store with the matrix of output values, a control panel 29 enables parameter values to be set in accordance with the system characteristics and the characteristics of the original to be reproduced. These parameter values are entered into the digital computer, which is programmed to provide the required output-input relationship. A display 30 permits the effect of this relationship and the effect of the parameter settings to be inspected before the matrix of output values is calculated by the computer 24 and entered into the store 25.

As an example, the parameter controls may be used to adjust tone compensation and to set any required "editorial" colour changes. The digital computer programme may take into account the transparency colour correction, the derivation of a black printer signal and the consequent removal of "undercolour" from the colour-component signals, the ink grey balance and the printing characteristic.

Figure 2:
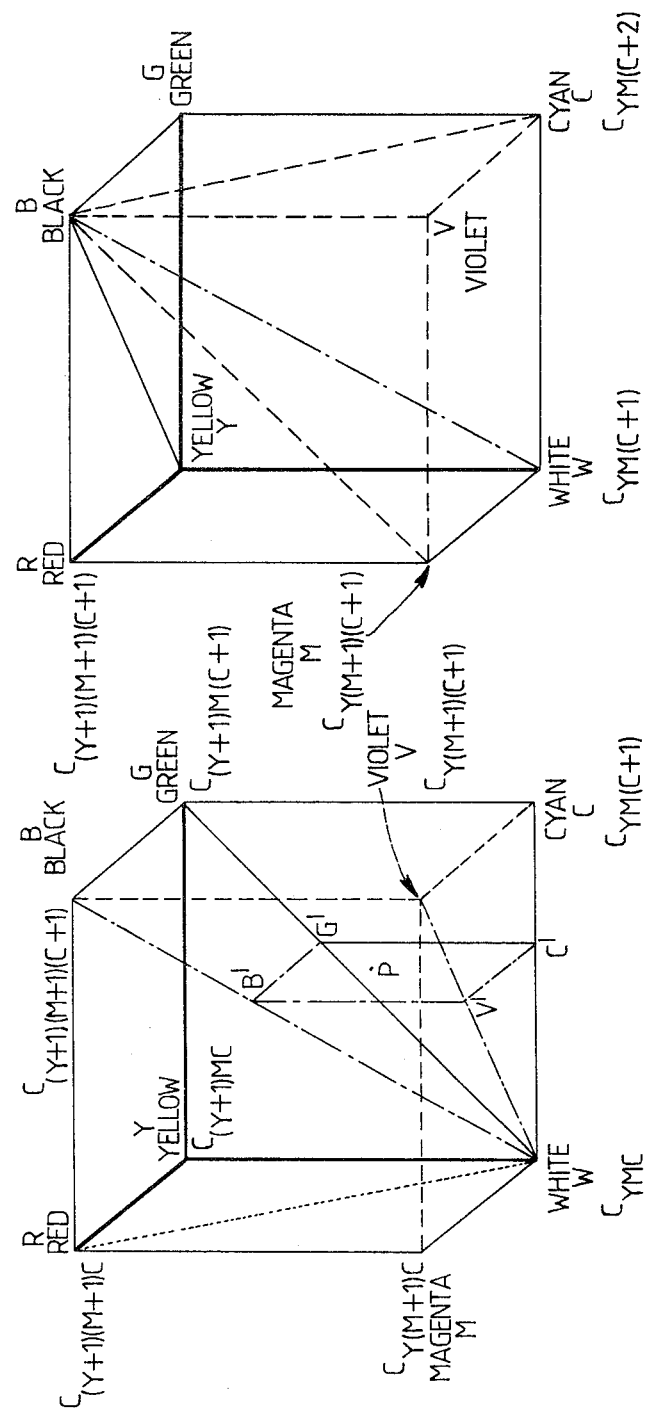
FIG. 2 illustrates the manner in which a unit cube of three-dimensional colour space is divided into pyramids for interpolation purposes.

FIG. 2 shows two "unit interpolation cubes" in which the division into pyramids is illustrated. The three pyramids have in common the W-B line or "neutral axis" i.e. this line is an edge of all three pyramids. In the left cube, one of the three pyramids has the five vertices W, B, G, V and C, a second has the vertices W, Y, R, B and G, and the third has the vertices W, M, R, B, and V. It will be seen that each of these pyramids has a base consisting of one complete face of the cube and has two sides each comprised of one half face of the cube. Also, the cyan, yellow and magenta corners (i.e. those corners corresponding to the printing inks), are all contained within different pyramids. In the right cube, the division into three pyramids is made so that the Black vertex, and not the White vertex, is common to all three pyramids. The cubes of the storage could be divided into pyramids in the same way, so that for example the cube on the left in FIG. 2 would be repeated throughout the storage. However, the edges of the pyramids of different cubes would not then be aligned at adjacent cube faces, although the results from this method of interpolation are satisfactory, the results can be improved by ensuring that no edge of any pyramid lies across a face of any other pyramid. The interpolation is more efficient if the pyramids of adjacent cubes share the same edges. Preferably, alternate cubes of the storage are divided according to the left and the right cubes of FIG. 2. Thus each cube divided with the White vertex common to three pyramids is surrounded by six cubes of the type with the Black vertex common to three pyramids, and vice versa. All the cubes of a given type have the same orientation, as shown in FIG. 2. With this arrangement, the edges of adjacent pyramids are matched; for example the Red/White diagonal in the cube on the left of FIG. 2 is matched with the Black/Cyan diagonal of a cube similar to the cube of the right of FIG. 2. The following description applies to the preferable system of division.

In carrying out the interpolation, the first step is to choose the pyramid in which lies the point for which interpolation is required. This depends on the "low bits" of the colour channel signals; the high bits define the unit interpolation cube in which the point falls and the low bits define the position of that point within the selected cube. For the cube on the left in FIG. 2, the point lies in one of the pyramids according to which of the colour channel signals has the highest value in its low bits. For the cube on the right, which divides into three different pyramids, the point lies in one of the pyramids according to which of the colour channel signals has the lowest value in its low bits. For example, a point at which the cyan low bits have the lowest value must be placed in the pyramid whose vertices are W, B, R, M and Y. With the cube on the left of FIG. 2, when the cyan channel has the highest value of "low bits" the pyramid chosen is the one having for its vertices W, B, C, G and V. When magenta has the highest low bits, the selected pyramid is that having for its vertices W, B, R, M and V. Finally for the case in which the yellow channel has the highest low bits, the pyramid selected has the vertices W, B, G, Y and R.

If the low bits of all three channels are equal, it does not matter which pyramid is chosen, since the point lies on the common "neutral axis".

In the left cube in FIG. 2, the pyramid shown is that which is used when the cyan low bits are highest. For a "parallel plane" method of interpolation, the procedure is as follows. First the square base BGCV of the pyramid is projected on to the parallel plane B'G'C'V', which is the plane for the cyan low-bit value and therefore passes through the point for which interpolation is required.

The output values at the points B'G'C'V' are obtained by linear interpolation along the lines WB'B, WG'G and WV'V using the cyan low bits:

$$B' = W(1-c) + B.c \qquad (1a)$$

$$G' = W(1-c) + G.c \qquad (1b)$$

$$C' = W(1-c) + C.c \qquad (1c)$$

$$V' = W(1-c) + V.c \qquad (1d)$$

The final answer is obtained from these four intermediate values by two-dimensional interpolation within the square B'G'C'V' using the yellow and magenta low bits. The yellow and magenta low bits must be scaled by the cyan low bits to give the proper weights to the points B'G'C'V', the scaled values being $$y' = y/c$$

$$m' = m/c$$

Final Output
$$= B' \cdot [(y'm')] \qquad (2a)$$
$$+ G' \cdot [y' (1 - m')] \qquad (2b)$$
$$+ C' \cdot [(1 - y')(1 - m')] \qquad (2c)$$
$$+ V' \cdot [m' (1 - y')] \qquad (2d)$$

Figure 3:
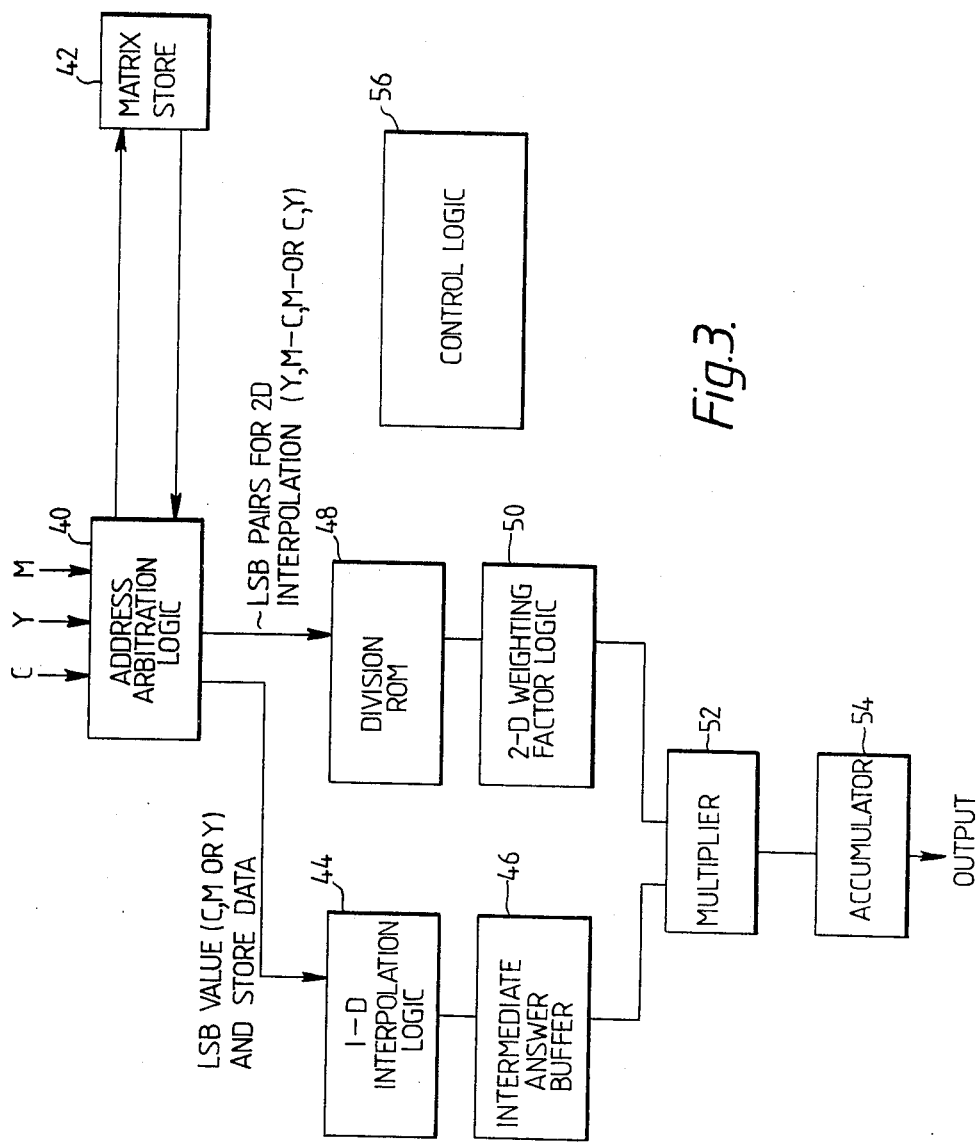
FIG. 3 is a diagram illustrating the manner in which the interpolation is carried out.

FIG. 3 shows diagrammatically one embodiment of apparatus for carrying the invention into effect. In FIG. 3, the picture signal values are fed into an "address arbitration logic" block 40 which selects which of the three pyramids encloses the interpolation point and thus which five corners of the cube must be addressed. The white point is always addressed and is obtained first from the matrix store 42. The next point obtained from the matrix store is the Black point, for example. The white and black values W, B and the cyan LSB (least significant bit) are supplied to a linear 1-dimensional interpolation unit 44 in which a linear interpolation is performed between the White and Black points using the cyan LSB (least significant bit) value. This gives the intermediate answer B' according to equation (1a) and B' is then stored in a buffer store 46. The address arbitration logic 40 also determines which two LSB values are needed for the subsequent 2-dimensional interpolation, in this example y and m, and supplies these to the division ROM 48. The y and m values must be scaled by dividing by the c value; the resulting values y' and m' are transferred to a two-dimensional weighting factor calculator 50, which provides at its output a value y'm' or y'(1−m'), for example. The intermediate answer B' is then fed to a multiplier 52 where it is multiplied by a weighting factor (in this case y'm') according to equation (2a). The result of this multiplication is stored in an accumulator 54.

Next the Green point, say, is obtained and subjected to 1-dimensional and 2-dimensional interpolation according to equations (1b) and (2b). The result is added to the accumulator. The process is repeated for the Cyan and Violet corners and the final result can then be taken from the accumulator.

Next, the whole process may be repeated for yellow, magenta and black colours. Alternatively, it may be that only one or two colour separations are required, in which case only the corrected colour component values for those colours that are required are extracted from the matrix store.

The sequence of operations is controlled by a control unit 56. The process described above involves extracting up to four corrected colour component values from the matrix store and processing them in sequence. However, they may be extracted in sets of two or more, and processed in parallel, for example using two or more sets of the processing units of FIGS. 3 or 4.

Figure 4:
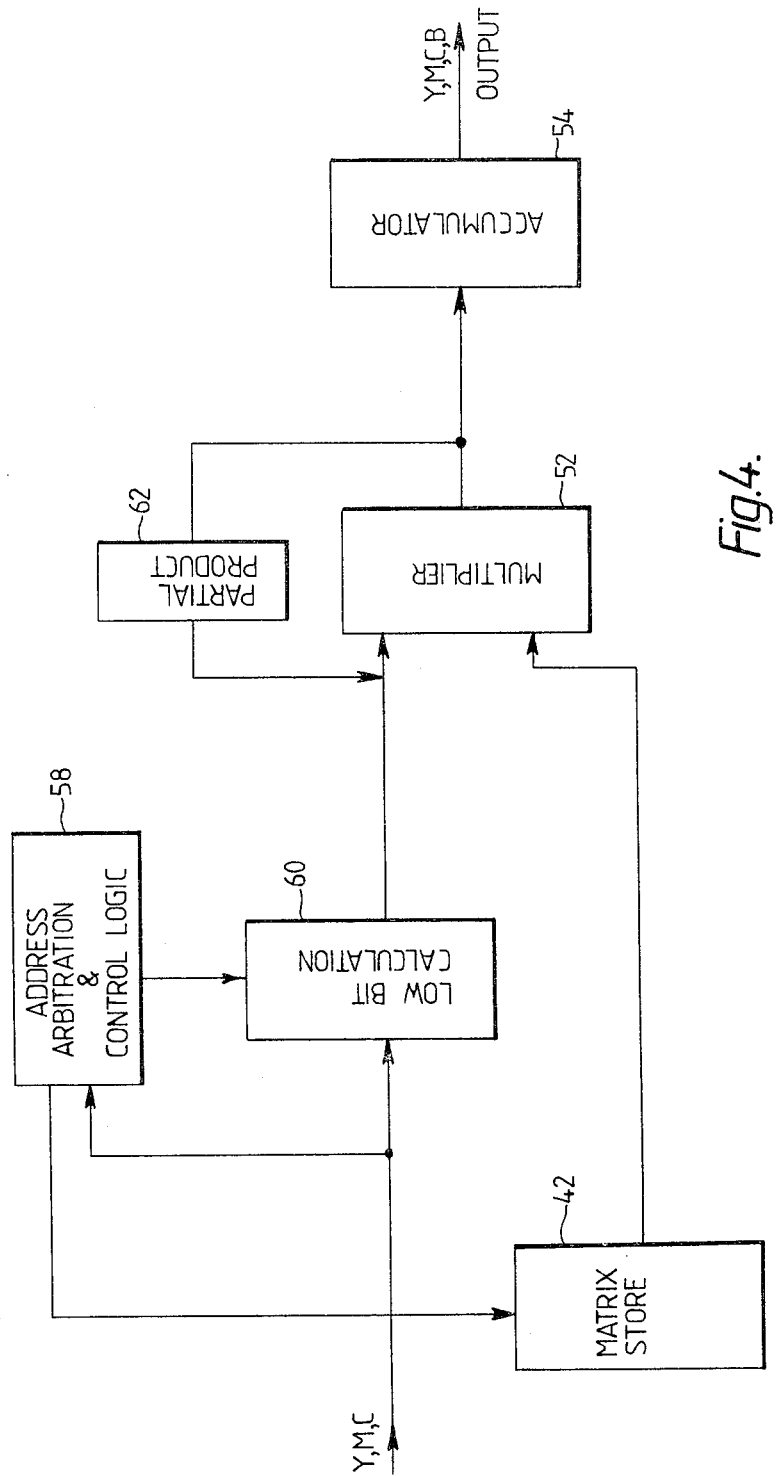
FIG. 4 is a diagram showing an alternative to the apparatus of FIG. 3.

FIG. 4 shows an alternative embodiment of apparatus according to the invention. In FIG. 4, the picture signal values are fed into a unit 58 for address arbitration and control logic, which performs the functions of the units labelled 40 and 56 in FIG. 3. The matrix store 42 is addressable by the unit 58, and stores the five values at the vertices of the pyramid containing the point corresponding to the picture signal values. A low bit calculation unit 60 is responsible for the derivation of the scaled values, for example y'm', as described above.

The multiplier unit 52 multiplies the values (e.g. B, W) from the matrix store 42 by scaled values from the low bit calculation unit 60, intermediate products being fed back to the multiplier unit 52 via a partial product unit 62. The final output value is obtained by accumulating and adding the products from the multiplier unit 52, as described above.

The address arbitration logic unit 40, or the address arbitration and control logic unit 58, may decide which pyramid contains the point by the following method.

If there are two alternating types of cube, as shown in FIG. 2, then the first task is to determine which type of cube contains the point. The fourth most significant bit of each channel signal is used in this determination. The MBS coordinates of adjacent cubes differ in this fourth bit. It will be appreciated that the sum of the fourth MSB's from the three colour channel signals is either odd or even; this determines which type of cube contains the point represented by those signals. For example, if the sum of the fourth MSB's is even, it will end in "0", and it is determined that the point is in a cube of the type shown on the left of FIG. 2.

The next task is to compare the values of the LSB's of the colour channel signals. For the left cube, the point lies in whichever pyramid has, as one of its vertices, the colour with the highest value in the LSB's. For the right cube, the point lies in whichever pyramid does not have, as one of its vertices, the colour with the lowest value in the LSB's.

I claim:

1. A method of reproducing a coloured original in which the original is scanned to obtain signals representing three colour-component densities of successively scanned picture elements of the original and in which said signals are corrected before being used to control the treatment of an output surface, said method comprising, prior to the scanning of the original, the steps of deriving, for each of a number of sets of three input digital colour-component values fewer in number than the sets of possible input digital colour-component values available from the scanner, a set of four corrected colour component values in digital form, one for each of the three colour components and one for black, and loading the sets of four corrected colour-component digital values into storage locations of a three-dimensional store, said store being represented as a cubic matrix consisting of adjacent unit interpolation cubes, each unit interpolation cube being formed by an addressed point and the seven neighbouring points which would be addressed by incrementing by one "coarse" unit, each colour-component density signal value singly and in all combinations, so that the locations of the corners of the cubes represent the three-dimensional digital colour-component values, the corresponding sets of four corrected colour-component values being stored at those locations; and thereafter addressing locations of the store by means of the succession of sets of three colour-component signals derived from the scanning of the original to obtain from the store a corresponding succession of corrected digital values, obtaining values intermediate the sets of digital values stored for unit interpolation cubes of said matrix by on-line interpolation, controlling the treatment of the output surface in accordance with the four values obtained from the interpolation, in which each of the four values for a point within a unit interpolation cube of the matrix is obtained by first determining in which of three pyramids, which together make up the unit interpolation cube and have as a common edge the "neutral axis" of the unit interpolation cube, said point is contained, and deriving a value for said point by interpolation within the pyramid, whereby each of the values for said point is the sum of predetermined functions of the values for the vertices of the pyramid, said functions also varying with the distances of said point from faces of the pyramid.

2. A method in accordance with claim 1, wherein the unit cubes are divided into three pyramids each with a vertex at the "white" corner or each at the "black" corner, wherein any two adjacent cubes are divided in these two different ways, so that no edge of any pyramid lies across a face of another pyramid.

3. A method in accordance with claim 1 or 2, wherein the interpolated value is obtained by first obtaining interpolated values for the corners of a plane intersecting the pyramid and parallel to its base and containing the required point, and then interpolating within said plane to obtain a value for said point.

4. Apparatus for reproducing a coloured original, comprising: a scanner for analysing the original to obtain three signals representing three colour-component densities of successively scanned picture elements, an analogue-to-digital converter, a digital memory storing for each of a number of sets of three digital colour-component values, a set of values comprising corrected values for the three colour-components and a black printer value, said number being less than the number of digital values which can be provided by said converter, means for treating an output surface to reproduce thereon the coloured original, means operable to address said digital memory in accordance with the succession of sets of three colour-component signals derived from the original by the scanner to obtain from the digital memory a succession of signal values for controlling the means for treating the output surface, and an interpolator operating on-line in accordance with the signals derived from the scanner to provide sets of corrected colour-component values intermediate the sets of stored digital values, wherein said digital memory may be represented as a cubic matrix consisting of adjacent unit interpolation cubes, each unit interpolation cube being formed by an addressed point and the seven neighbouring points which would be addressed by incrementing by one "coarse" unit each colour-component density signal value singly and in all combinations, so that the locations of the corners of the cubes represent the three digital colour-component values, the corresponding sets of four corrected colour-component values being stored at those locations, in which said means operable to address the digital memory addresses successive locations of the digital memory by means of the succession of sets of three colour component signals derived from the scanning of the original to obtain from the memory a corresponding succession of sets of corrected digital values, and in which the interpolation unit comprises means for determining in which of three pyramids making up a unit interpolation cube the required point is contained, the pyramids having as a common edge the "neutral axis" of the unit interpolation cube, and means for interpolating within said pyramid to obtain a value for the required point, the value being the sum of predetermined functions of the values for the vertices of said pyramid, said functions also varying with the distances of the required point from faces of the pyramid.

5. Apparatus in accordance with claim 4, wherein the interpolation unit divides the unit cubes into three pyramids each with a vertex at the "white" corner or each of the "black" corner, wherein any two adjacent cubes are divided in these two different ways, so that no edge of any pyramid lies across a face of another pyramid.

6. Apparatus in accordance with claims 4 or 5, in which the interpolation unit includes means for obtaining interpolated values for each of the four corners of a plane parallel to the base of the selected pyramid and containing the required point; and means for interpolating linearly within said plane to obtain a value for the required point.

* * * * *